(No Model.)
F. MEYROSE & W. H. CURTIS.
BICYCLE BELL.
No. 577,488.                                Patented Feb. 23, 1897.
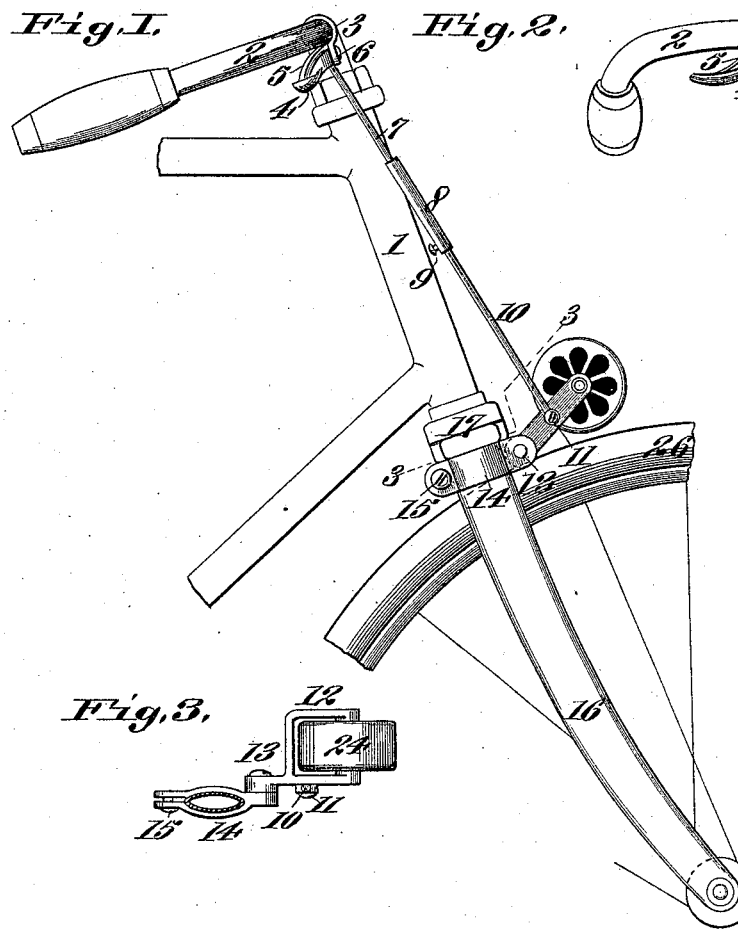
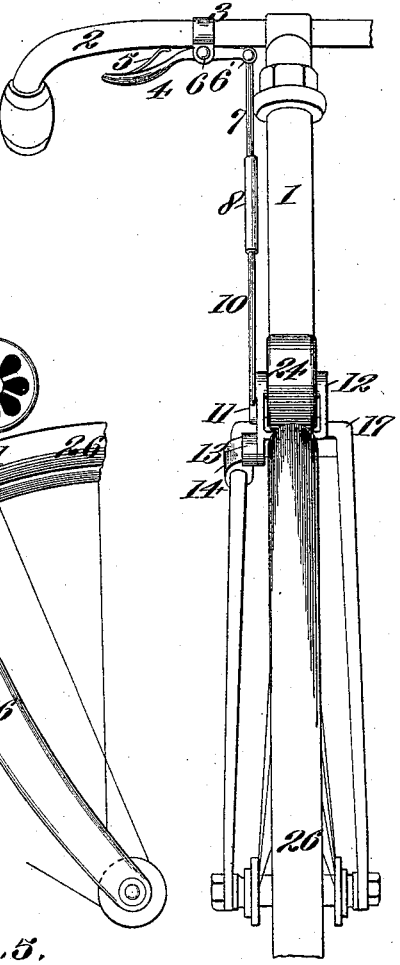
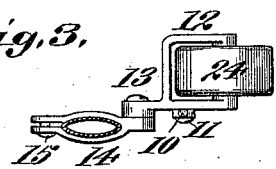
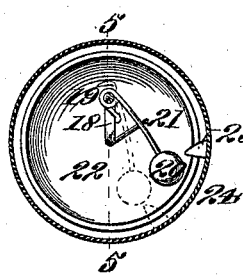
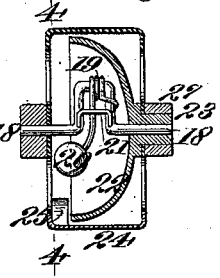
Attest:
Marlow Kershaw
Josie Bressingham
Inventors,
Ferdinand Meyrose
William H. Curtis
By E. J. O'Brien
Atty.

UNITED STATES PATENT OFFICE.

FERDINAND MEYROSE AND WILLIAM H. CURTIS, OF ST. LOUIS, MISSOURI.

BICYCLE-BELL.

SPECIFICATION forming part of Letters Patent No. 577,488, dated February 23, 1897.

Application filed November 21, 1896. Serial No. 612,930. (No model.)

*To all whom it may concern:*

Be it known that we, FERDINAND MEYROSE and WILLIAM H. CURTIS, citizens of the United States, residing at St. Louis, in the State of Missouri, have invented a new and useful Improvement in Signal and Warning Bells, especially applicable to Bicycles, of which the following is a specification.

Our invention has for its objects, first, to provide a bell that can be operated at the will of a bicycle-rider by friction contact of the bell apparatus and the bicycle-wheel; second, to indicate to others on the same road by the ringing of the bell the approximate speed at which the bicycle is traveling toward them from the rear; third, to provide an annular revolving casing for a stationary bell, whereby the latter is operated, and, fourth, to provide means whereby the bell apparatus may be placed in frictional contact with the wheel of the bicycle from the handle-bar and thus operated or released therefrom. We attain these objects by the device and apparatus hereinafter described, and shown in the accompanying drawings, in which—

Figure I is a detailed side elevation. Fig. II is a detailed front elevation. Fig. III is a horizontal section on line 3 3, Fig. I; Fig. IV, a vertical section on line 4 4, Fig. V, with bent crank shown in section; and Fig. V, a vertical longitudinal section on line 5 5 of Fig. IV, showing the crank and clapper mechanism in elevation.

Similar figures refer to similar parts throughout the several views.

1 represents the steering-head in a diamond-frame bicycle; 2, the handle-bar; 3, a band-clip; 4, a handle-lever; 5, a spring; 6, the fulcrum of the hand-lever; 6', pin connections of the upwardly-connecting rod 7 and the hand-lever 4; 8, extension connecting-tube holding upwardly-extending rods 7 10; 9, a set-screw; 11, pin connection of the upwardly-extending rods 10 7, with the bifurcated lever 12; 13, fulcrum of bifurcated lever; 14, band-clip; 15, binding-screw of band-clip 14; 16, fork of bicycle-frame; 17, crown of same; 18, bent spindle supporting the bell and housing at the outer end of the bifurcated supporting-lever 12; 19, spring of gong-clapper; 20, gong-clapper; 21, stop; 22, bell or gong; 23, hub of the gong secured to the bifurcated lever 12; 24, annular revolving case or housing having openings on its sides; 25, bell-tappet fixed on the inner periphery of the revolving bell-casing; 26, bicycle wheel and tire; 27, hub to revolving casing 24.

The device and apparatus constituted as aforesaid combines with a bicycle or other wheel and affords a gong or bell ringing attachment thereto which can be operated by the rider by pressing the hand-lever 4 with the hand around it and the handle-bar of the machine. The revolving annular gong-case 24 is thus brought in frictional contact with the bicycle-wheel 26, and thereupon the casing revolves around the bell 22, and the tappet 25 on the inner periphery of the revolving case 24 strikes against the ball of the bell-clapper 20 and pushes it forward to the position shown in dotted lines, Fig. 4. Then it is released, and, urged by the spring 19, strikes sharply upon the gong 22, repeating the strike for each revolution of the gong-case, and continues thus ringing while the hand-pressure on the lever 4 is maintained. When it is released, the bifurcated lever 12, carrying the ringing apparatus, is lifted from the contact with the bicycle-wheel by the spring 5 of the hand-lever 4, and the ringing of the bell ceases.

It is obvious that the greater the speed at which the bicycle-rider is urging the machine at the time he applies his hand to the bell-lever and insures the ringing of the bell the quicker the strokes of the clapper upon the gong will follow each other, and thus any one in hearing distance can approximate whether the rider is going at a rapid or a slow rate of speed, and govern themselves accordingly.

Having thus described our invention, that which we claim as new, and desire to secure by Letters Patent, is—

1. The annular rotating bell-case, provided with a tappet revolving by frictional contact with a driven wheel about a fixed bell—and thereby operating the bell-hammer, substantially in the manner shown and described and for the purpose set forth.

2. The bell attachment for a bicycle, consisting of the rotating bell-case, 24, provided with a tappet, in combination with a stationary bell supported on a bifurcated lever, and operated by contact with a driven wheel through suitable rod-and-lever connections with the handle-bar of the machine substantially in the manner shown and described and for the purposes specified.

FERDINAND MEYROSE.
    WILLIAM H. CURTIS.

In presence of—
 B. J. MEYROSE,
 GEO. C. HUTCHINGS.